United States Patent
Brouwer et al.

(10) Patent No.: US 7,407,362 B2
(45) Date of Patent: Aug. 5, 2008

(54) METHOD AND APPARATUS FOR LIFTING SOD FROM THE TOP

(75) Inventors: Gerardus J. Brouwer, Keswick (CA); Robert Milwain, Keswick (CA)

(73) Assignee: 1045929 Ontario Limited, Keswick, Ontario (CA)

( * ) Notice: Subject to any disclaimer, the term of this patent is extended or adjusted under 35 U.S.C. 154(b) by 9 days.

(21) Appl. No.: 10/780,616

(22) Filed: Feb. 19, 2004

(65) Prior Publication Data

US 2005/0000704 A1  Jan. 6, 2005

Related U.S. Application Data

(60) Provisional application No. 60/528,494, filed on Dec. 11, 2003, provisional application No. 60/448,127, filed on Feb. 20, 2003.

(51) Int. Cl.
*B66C 3/00* (2006.01)
*A01B 79/02* (2006.01)
*A01C 1/00* (2006.01)
*A01G 1/00* (2006.01)
*A01H 3/00* (2006.01)

(52) U.S. Cl. ............ 414/736; 47/58.1 R; 47/901
(58) Field of Classification Search .......... 172/19, 172/20, 27–33, 776; 47/1.01 R, 1.01 F, 1.01 P, 47/1.7, 901, 58.1 R, 58.1 SE; 414/24.5, 24.6, 414/25, 132, 618, 560–574, 729, 736, 911
See application file for complete search history.

(56) References Cited

U.S. PATENT DOCUMENTS 3,326,592 A   6/1967   Pelton
5,673,513 A   10/1997  Casimaty
6,112,680 A * 9/2000   Hummer ................ 111/200

FOREIGN PATENT DOCUMENTS

WO   WO 00/25567 A   5/2000

\* cited by examiner

*Primary Examiner*—Christopher J. Novosad
(74) *Attorney, Agent, or Firm*—Bereskin & Parr

(57) ABSTRACT

Method and apparatus for lifting sod, in which grass blades of the sod are inserted between one or more clamps. The clamps are closed to grip the grass blades and the clamps are then moved, with the sod suspended therefrom, to a desired location. The clamps can if desired also grip the thatch, and/or a portion of the soil, of the sod slab.

8 Claims, 11 Drawing Sheets

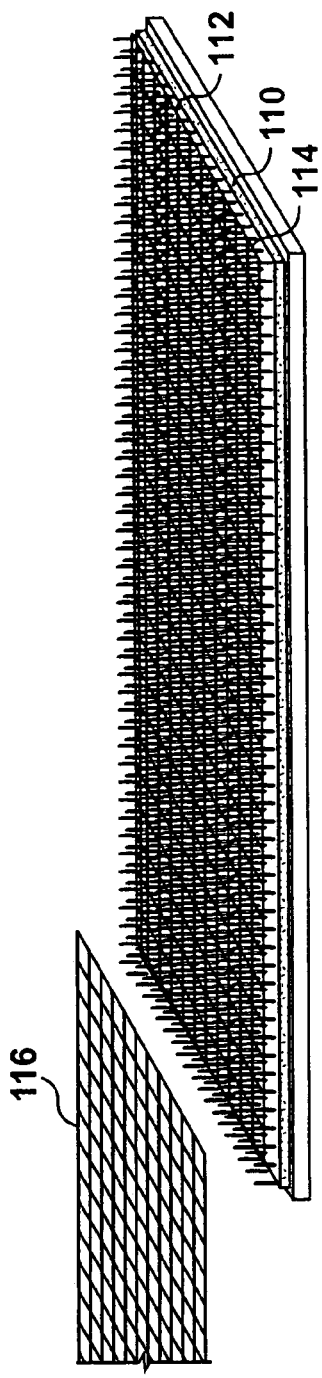
FIG. 18
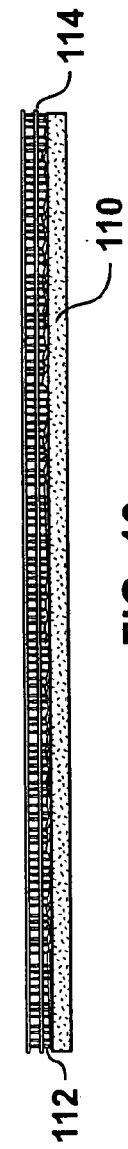
FIG. 19
FIG. 20
FIG. 21

METHOD AND APPARATUS FOR LIFTING SOD FROM THE TOP

PRIOR APPLICATION

This application claims the benefit of U.S. Provisional Application Ser. No. 60/448,127, filed Feb. 20, 2003 entitled "SOD PICKUP MECHANISM" and U.S. Provisional Patent Application Ser. No. 60/528,494, filed Dec. 11, 2003 entitled "METHOD AND APPARATUS FOR LIFTING SOD FROM THE TOP".

FIELD OF THE INVENTION

This invention relates to a method and apparatus for lifting sod from a position above the sod. More particularly, it relates to a mechanism and a method of lifting in which the sod is lifted by gripping the sod by (depending on the properties of the sod) the grass blades of the sod, or by the grass blades and by the thatch accumulated in the sod, or (in some cases) by the soil portion of the sod.

BACKGROUND OF THE INVENTION

Practical automatic sod harvesters, in which sod is harvested from the ground and stacked on a pallet, have existed for about 40 years. Originally, such harvesters formed the cut sod into rolls which were stacked on pallets, moved to a site where sod was needed, and then laid. However, there are various disadvantages associated with rolling the sod, and therefore an alternative method of sod handling became popular, in which the sod was simply cut into slabs (i.e. flat lengths of sod) which were stacked on pallets and handled in that form. Leaving the cut sod in flat slabs tends to impose less severe mechanical stresses on the sod, and in addition more sod can be stored in a smaller space. However, lifting the slabs automatically has proven difficult.

Various methods have been suggested for lifting sod slabs and for moving the slabs once lifted. One such method, suggested by the present applicants, was to pierce the sod slabs with hooks which could then be used to lift and move the slabs. However, the hooks, in use, in some cases protrude below the bottom surface of the sod slab and can in some situations create awkwardness in handling the slab. In addition, release of the sod slab from the hooks can sometimes be difficult.

In addition, once the sod slabs are stacked on a pallet and have been moved to a worksite where the sod is to be laid, it may not always be practical to employ hooks to lift the sod slabs in order to lay them. Therefore, to date, the sod slabs have usually been handled manually, which is a labor intensive and costly job.

BRIEF SUMMARY OF THE INVENTION

Therefore, it is an object of the present invention to provide a method and apparatus for lifting a sod slab from above the slab. In one aspect the invention provides a method of handling sod having grass blades projecting upwardly therefrom, comprising gripping at least an upper portion of said sod between opposing portions of a clamp and moving said clamp with said sod suspended from said clamp.

In another aspect, the invention provides apparatus for picking up sod of the kind having grass blades projecting upwardly therefrom, said apparatus comprising at least one clamp having an open and a closed condition, and a mechanism for opening and closing said clamp, a support mechanism for moving at least one of said sod and said clamp towards the other at a first location for at least said grass blades to enter into said clamp when said clamp is in its open condition, and a carrying mechanism for moving said clamp, with said sod slab suspended therefrom, to another location.

Further objects and advantages of the invention will appear from the following description, taken together with the accompanying drawings.

BRIEF DESCRIPTION OF DRAWINGS

In the drawings:

FIG. 18 is a diagrammatic perspective view of another form of clamp which may be used, employing screens;

FIG. 19 is a side view of the apparatus of FIG. 18, showing two screens applying clamping pressure to grass blades;

FIG. 20 is a diagrammatic side view, enlarged, showing portions of the screens of FIGS. 18 and 19 gripping grass blades; and FIG. 21 is a view similar to that of FIG. 20 but showing the upper screen replaced by a plate.

DETAILED DESCRIPTION OF PREFERRED EMBODIMENTS

Figure 1:
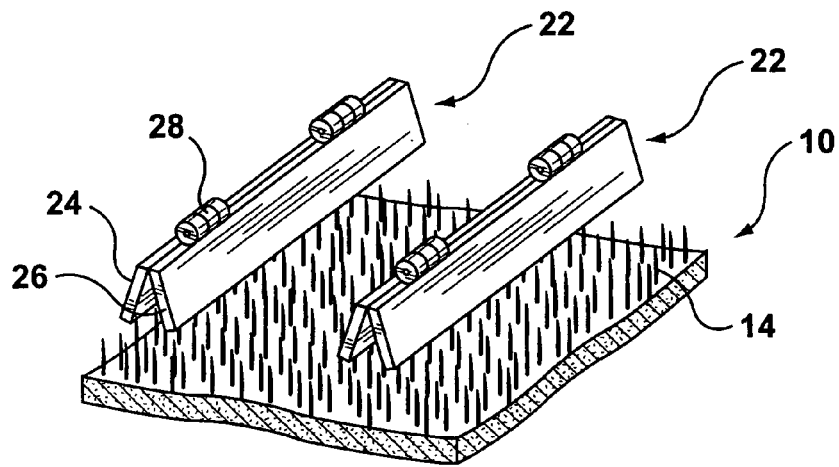
FIG. 1 is a diagrammatic perspective view of simplified apparatus for picking up a sod slab according to the invention.

Reference is first made to FIG. 1, which shows a sod slab 10 located on a support 12 and having upwardly protruding grass blades 14. The sod slab 10 also has, as is normal, a soil portion 16 containing grass roots, and thatch 18 immediately above the soil portion 16.

Located above the sod slab 10 are two elongated clamps 22, each consisting of a first side member 24 and a second side member 26 hinged at their tops by hinges 28. Any conventional mechanism (not shown) may be used for opening and closing the clamps 22 and for lifting them in unison.

Figure 2:
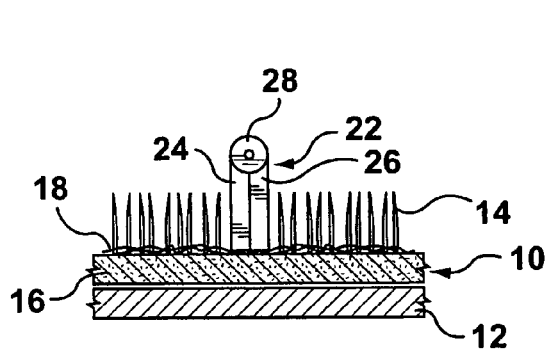
FIG. 2 is an end view of the apparatus of FIG. 1.
Figure 3:
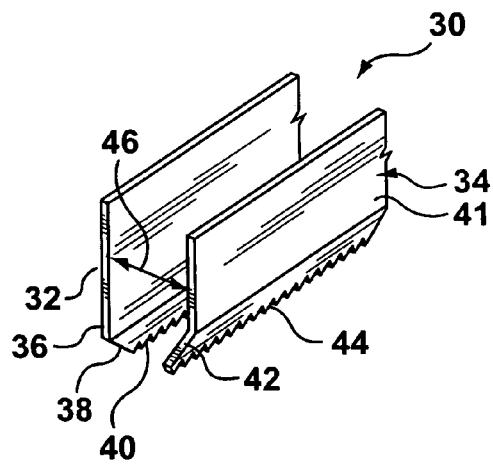
FIG. 3 is a perspective view of a modified form of clamp for picking up sod according to the invention.
Figure 4:
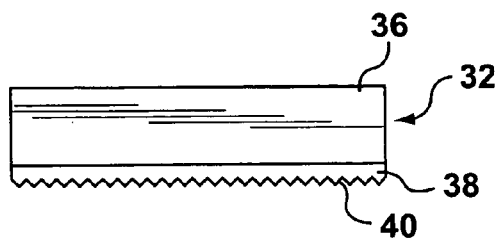
FIG. 4 is a side view of one side of the FIG. 3 clamp.
Figure 5:
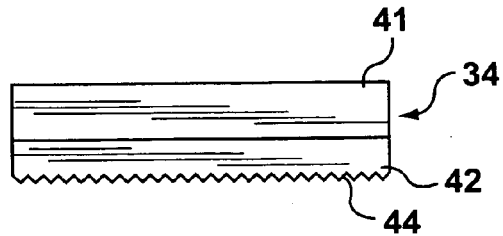
FIG. 5 is a side view of the other side of the FIG. 3 clamp.

In use, the two clamps 22, in open position as shown in FIG. 1, are lowered toward the sod slab 10 until grass blades of the sod slab 10 extend between the two side members 24, 26 of each clamp. The clamps are then closed, as shown in FIG. 2, to grip the sod slab 10 by its grass blades 14. The clamps 22 may then be lifted, carrying the sod slab 10 with them, and can be moved to move the sod slab 10 to a desired location, e.g. over a pallet, on which the sod slab 10 can be deposited.

The length of the grass blades 14 which needs to be gripped by the clamps 22 depends on the properties of the sod slab, for example on the length and strength of the grass blades available to be gripped, the strength of the root structure of the sod, and the weight of the sod slab (which varies depending on the thickness of the soil and the moisture content of the soil). Alternatively, the clamps 22 can grip the thatch 18, or the upper part of the soil portion 16, or can even extend through a lower part of the soil portion. This will be discussed in more detail later in this application.

Instead of lowering the clamps 22 onto the sod slab 10 as described, instead, the support 12 on which the sod slab 10 rests can be lifted to move the grass blades 14 into position between the side members of the clamps 22. Any desired lifting mechanism can be used, e.g. a scissors lift. The clamps 22 can then be closed to grip the sod slab, after which the support 12 can be lowered while the clamps are carrying the sod to a desired location. This method can be more efficient than the method previously described, since while the support 12 is being lowered to receive a new sod slab, the clamps 22 are moving to carry the suspended sod slab to a new position. Therefore, with this method, two operations are performed at the same time. (Alternatively, the clamps 22 can be lowered toward the sod slab 10, and the support 12 can raise the sod slab 10 toward the clamps 22, both at the same time, and then both these movements can be reversed once the sod slab 10 is gripped.)

If desired, the bottom inner surfaces of clamp side members 24, 26 can each be surfaced with a strip of rubber (not shown), for a better grip on the grass blades 14.

Reference is next made to FIG. 3 to 13 inclusive, which show another embodiment of the invention. The embodiment there shown includes clamps 30, best shown in FIGS. 3 to 5. Each clamp 30 has two clamping side members 32, 34. Side member 32 includes a generally vertical sidewall 36 with a bottom portion 38 extending at an angle inwardly toward the other side member 34 and terminating in a set of serrated teeth 40. The other side member 34 also has a generally vertical sidewall 41 but has a larger bottom portion 42 extending inwardly and downwardly toward the first side member 36. Bottom portion 42 also ends in a set of serrated teeth 44.

In use, and as will be described, one clamp side member 32 may be held stationary (to simplify the mechanism involved), while the other clamp side member 34 may be moved linearly, in the direction of arrow 46, towards and away from the first clamp side member 32. When the two clamp side members 32, 34 are pressed against each other, they serve to grip anything which extends between them, which can be grass blades 14, or grass blades 14 and thatch 18 from the sod slab, or even an upper portion of the soil portion 16 of the sod slab.

In the FIGS. 6 through 13 apparatus, which is exemplary only, a sod slab 10 to be lifted is moved on a conveyor 50 beneath a frame 52. Frame 52 is supported by straps 54 attached to a lifting mechanism, not shown, which can raise and lower the frame 52 away from and towards the sod slab 10. When the frame 52 is lifted, it can be moved (with the sod slab suspended therefrom) to a desired location. (In practice, the straps 54 will usually be eliminated and the lifting and moving mechanism will be directly attached to the frame 52.)

The frame 52 supports cross members 56, 58 which are connected to and carry the clamp side members 32, 34. As discussed, the cross members 56 which carry the stationary clamp side members 32 are fixed to the frame 52. The cross members 58 which carry the moving clamp side members 34 are biased by springs 60 to normally hold the clamps 30 in closed position, each clamp having its two clamp side members 32, 34 spaced apart as shown.

The moving clamp side members 34 are supported and opened by a linkage system generally indicated at 62. Linkage system 62 comprises a pair of long links 64 connected by metal straps 66 to each of the cross members 58 which carry the moveable clamp side portions 34. The links 64 can be moved back and forth in the direction of arrow 68 hydraulically (the hydraulic mechanism is not shown), or by any other desired mechanism, to open and close the clamps 30.

Figure 6:
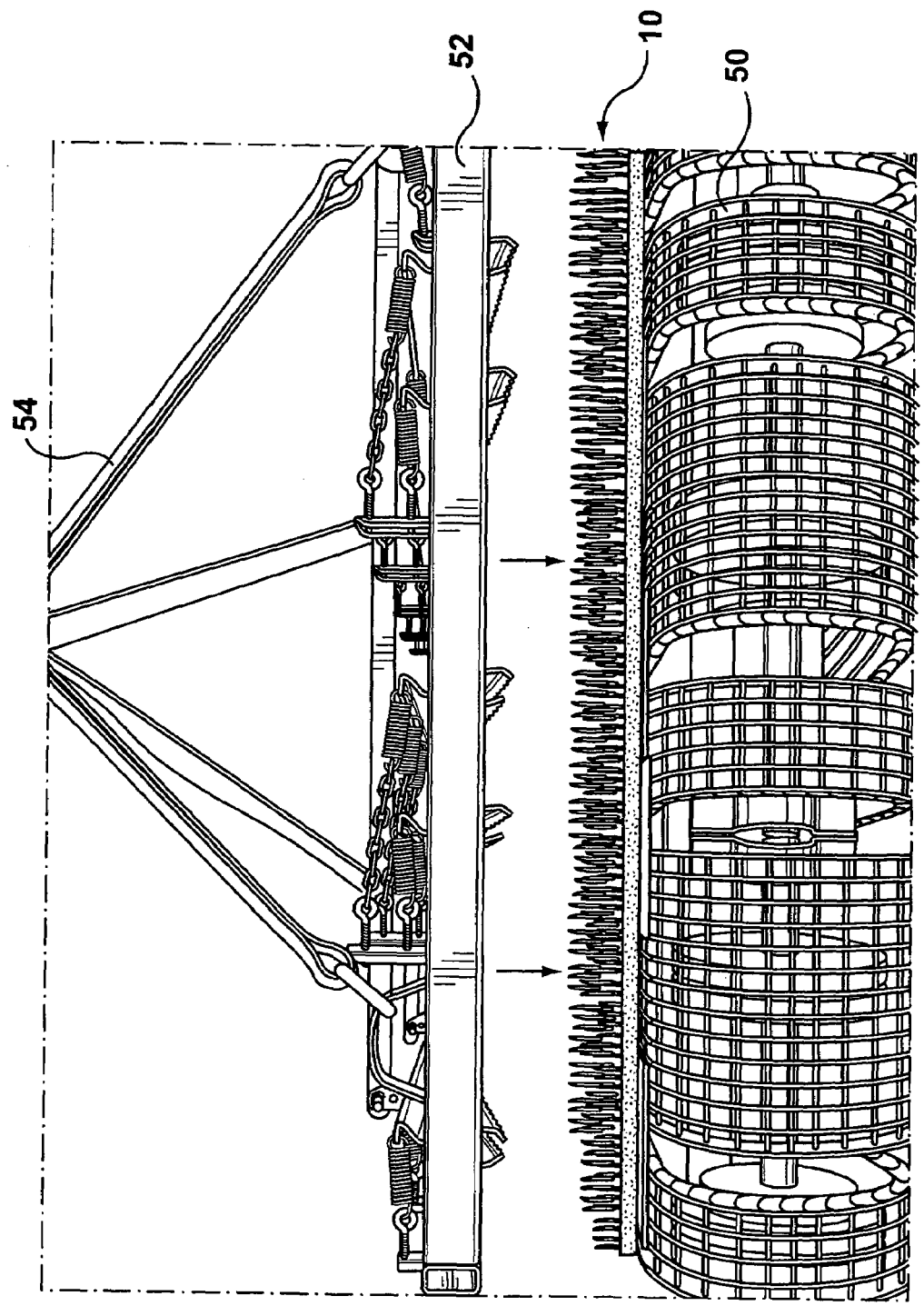
FIG. 6 is a perspective view of clamp structure according to the invention, with the clamps open and above the sod.
Figure 7:
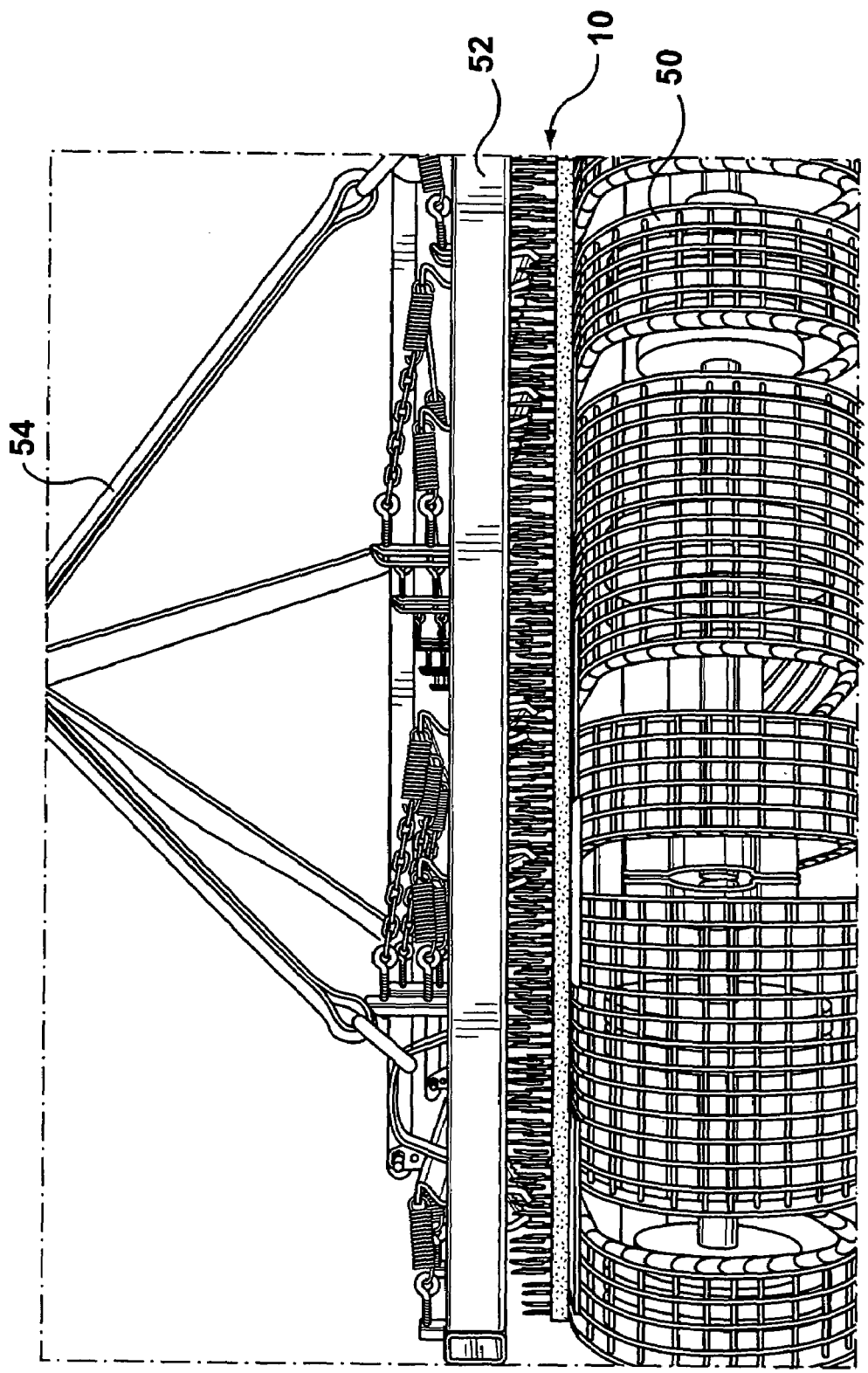
FIG. 7 is a view similar to that of FIG. 6 but showing the clamps down on the sod and pushed into the grass blades.

FIG. 6 shows the clamps 30 in open position and located above the grass blades of the sod slab 10. FIG. 7 shows the clamps 30 as having been lowered onto the grass blades 14 and pushed into the grass blades. For some types of sod (e.g. those with strong grass blades and thin soil), this degree of penetration is sufficient to lift the sod slab 10.

Figure 8:
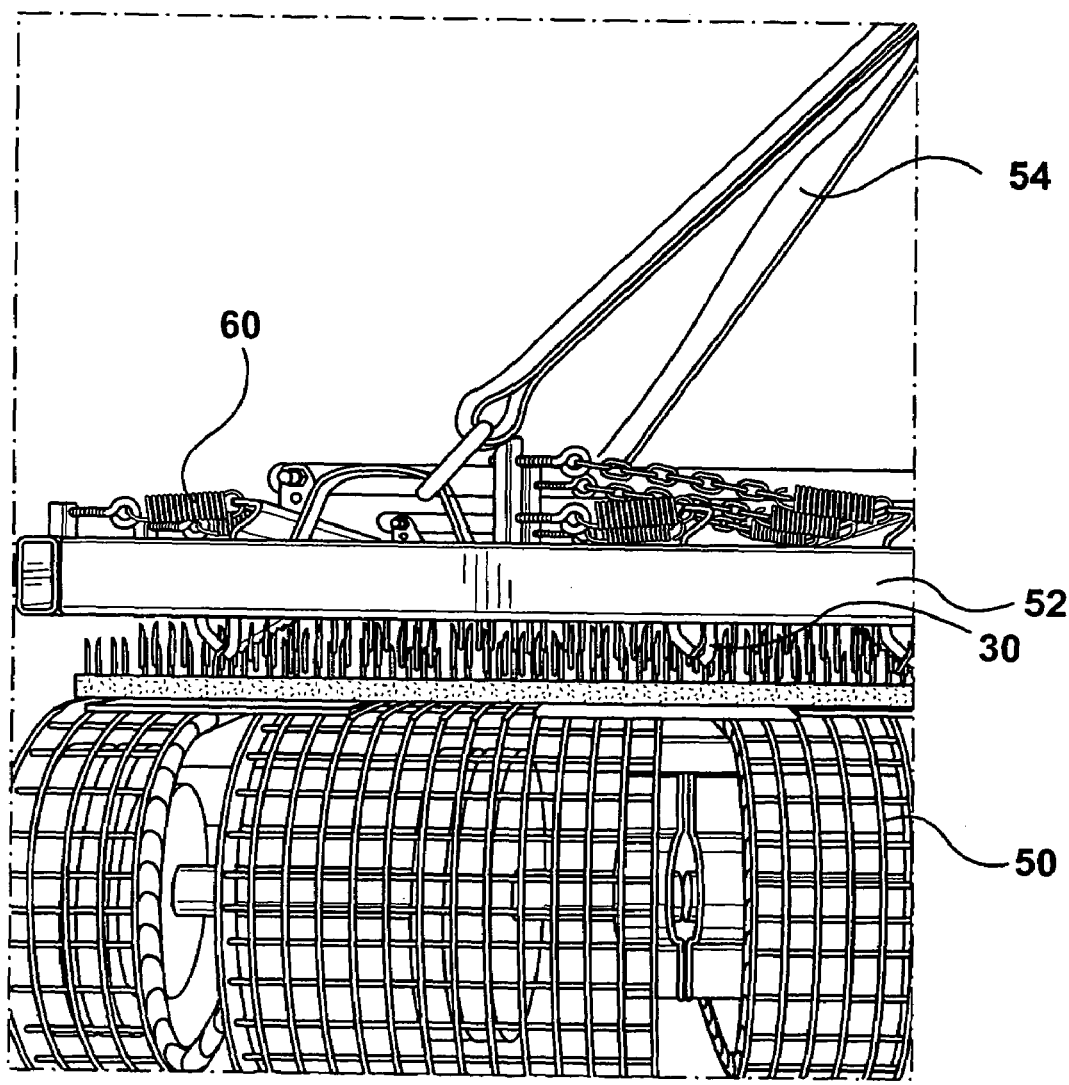
FIG. 8 is a view similar to that of FIG. 7 but showing the clamps penetrating into the grass blades and thatch of the sod.

FIG. 8 is similar to FIG. 7 but shows the clamps 30 as having been pushed downwardly, not only into the grass blades 14, but also into the thatch 18 which is located just above the soil 16 of the sod slab 10. For some types of sod, this degree of penetration is needed and will be sufficient to lift the slab. For other types of sod, it may be necessary to push the clamps 30 slightly further, so that they penetrate slightly into the upper portion of the soil 16 of the sod slab 10. It is found that none of the positions described above for the clamps 30 damages the sod slab 10.

Figure 9:
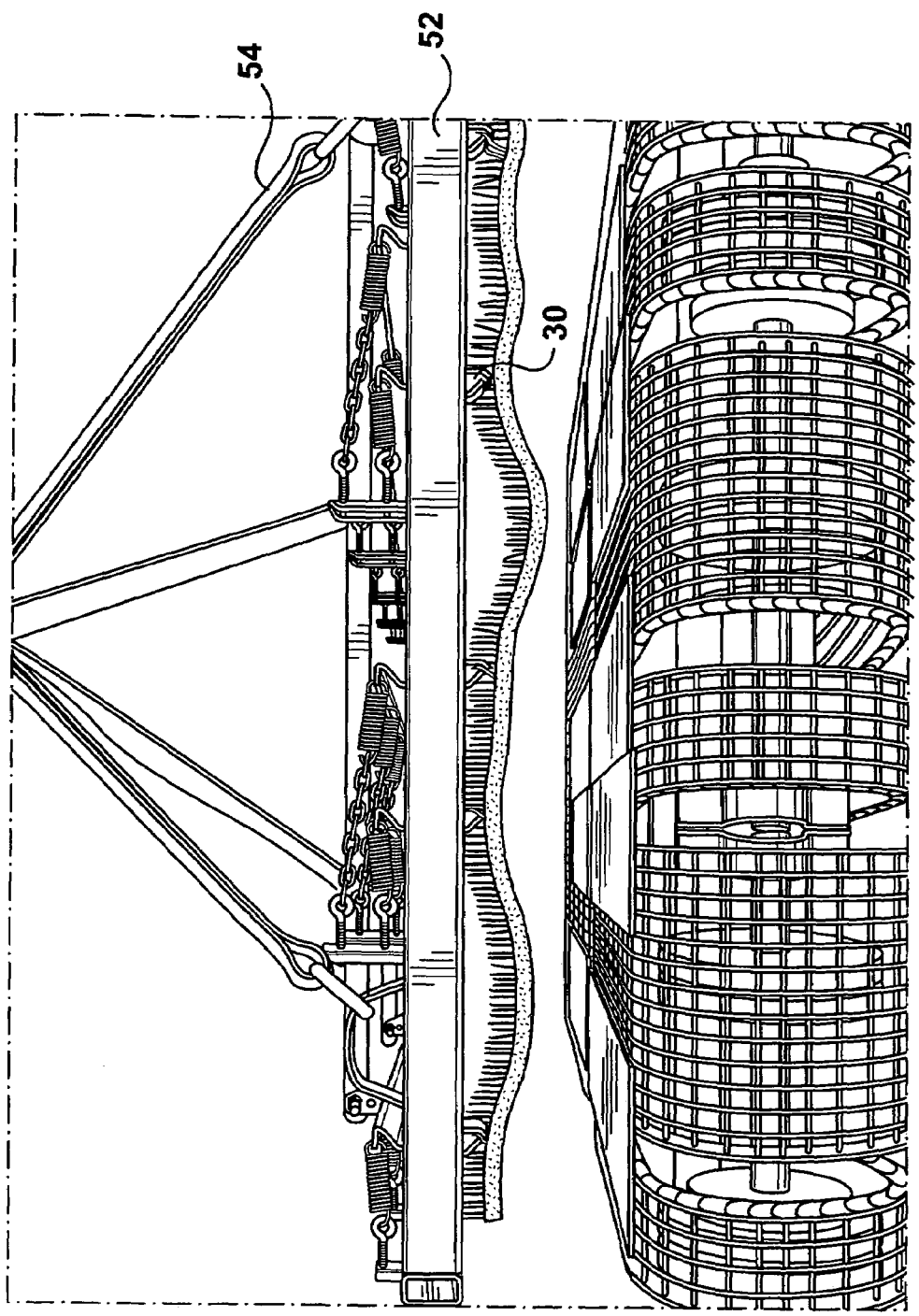
FIG. 9 is a view similar to that of FIG. 6 but showing the clamps closed and the sod being lifted.
Figure 10:
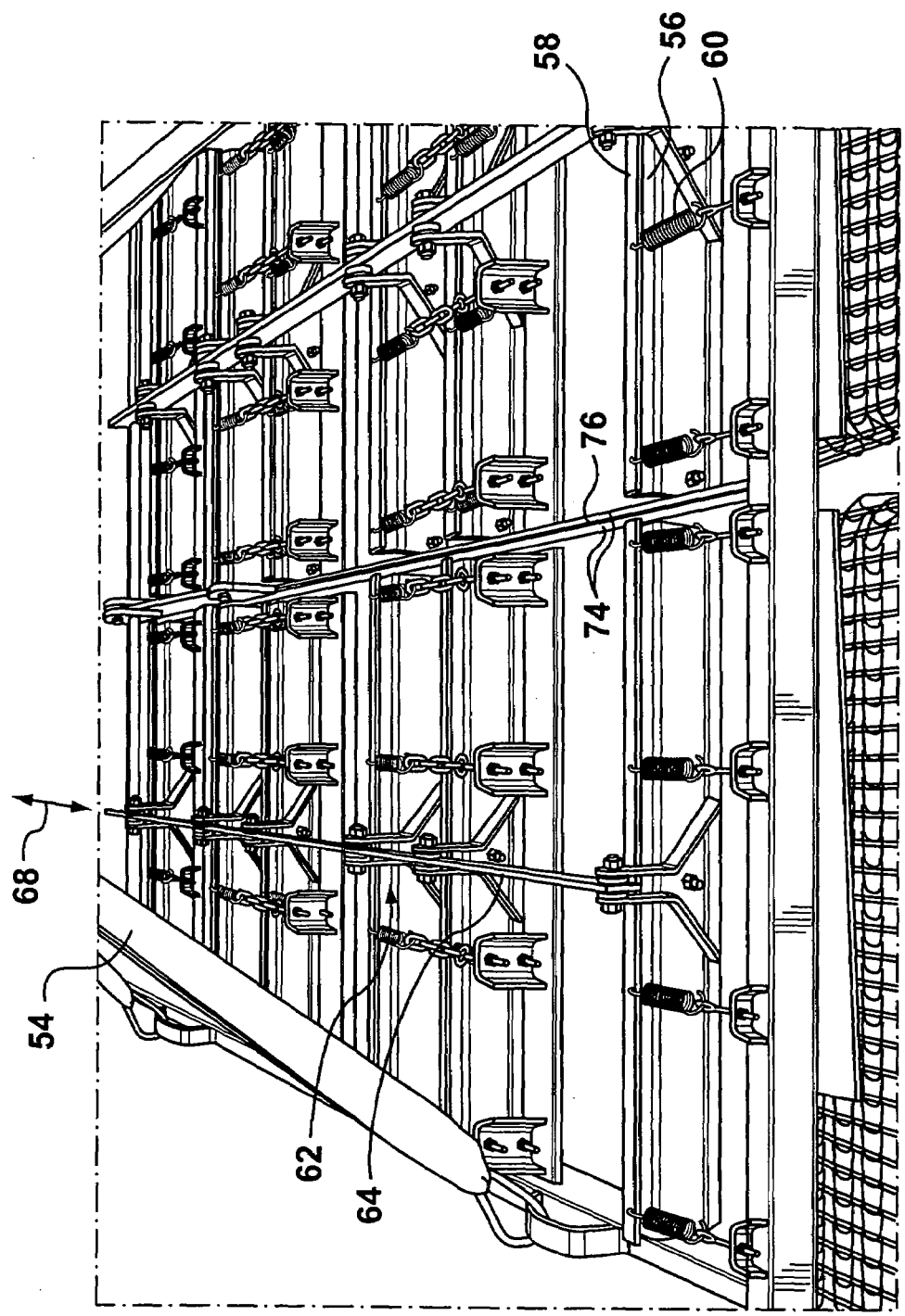
FIG. 10 is a perspective view from above, showing a linkage system for closing and opening all of the clamps together.

FIG. 9 shows the clamps 30 as having been closed from the position of FIG. 8, and with the frame 52 and the sod slab 10 being lifted by the straps 54. As shown, the sod slab is being picked up by its grass portion, i.e. from the top of the sod slab.

Figure 11:
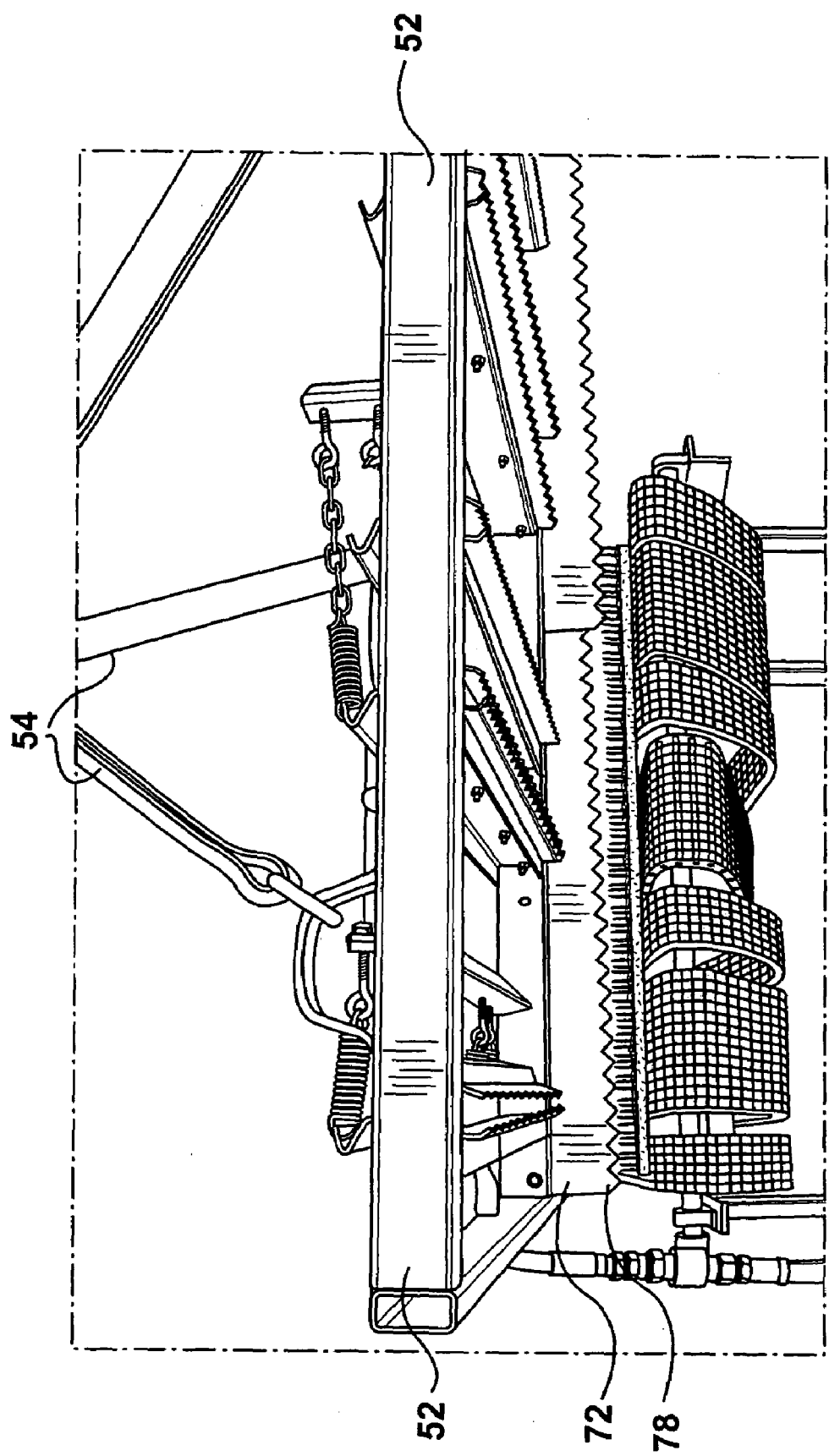
FIG. 11 is a view from below the clamp apparatus of FIG. 6, showing the structure of the clamps and their teeth.

In the embodiment shown in FIGS. 6 to 13, a 48 inch by 48 inch sod slab is accommodated. This type of sod slab is typically harvested by a large harvester, but it is too large to handle easily. Therefore, and as shown in FIG. 11, a cut-off blade 72 may be provided. To accommodate the cut-off blade 72, the frame 52 is divided into two portions by a pair of sub-frame members 74 extending lengthwise along one dimension of the frame 52, adjacent the center of the frame 52. The sub-frame members 74 are spaced a very short distance apart to define a slot 76 between them through which the cut-off blade 72 protrudes.

Figure 12:
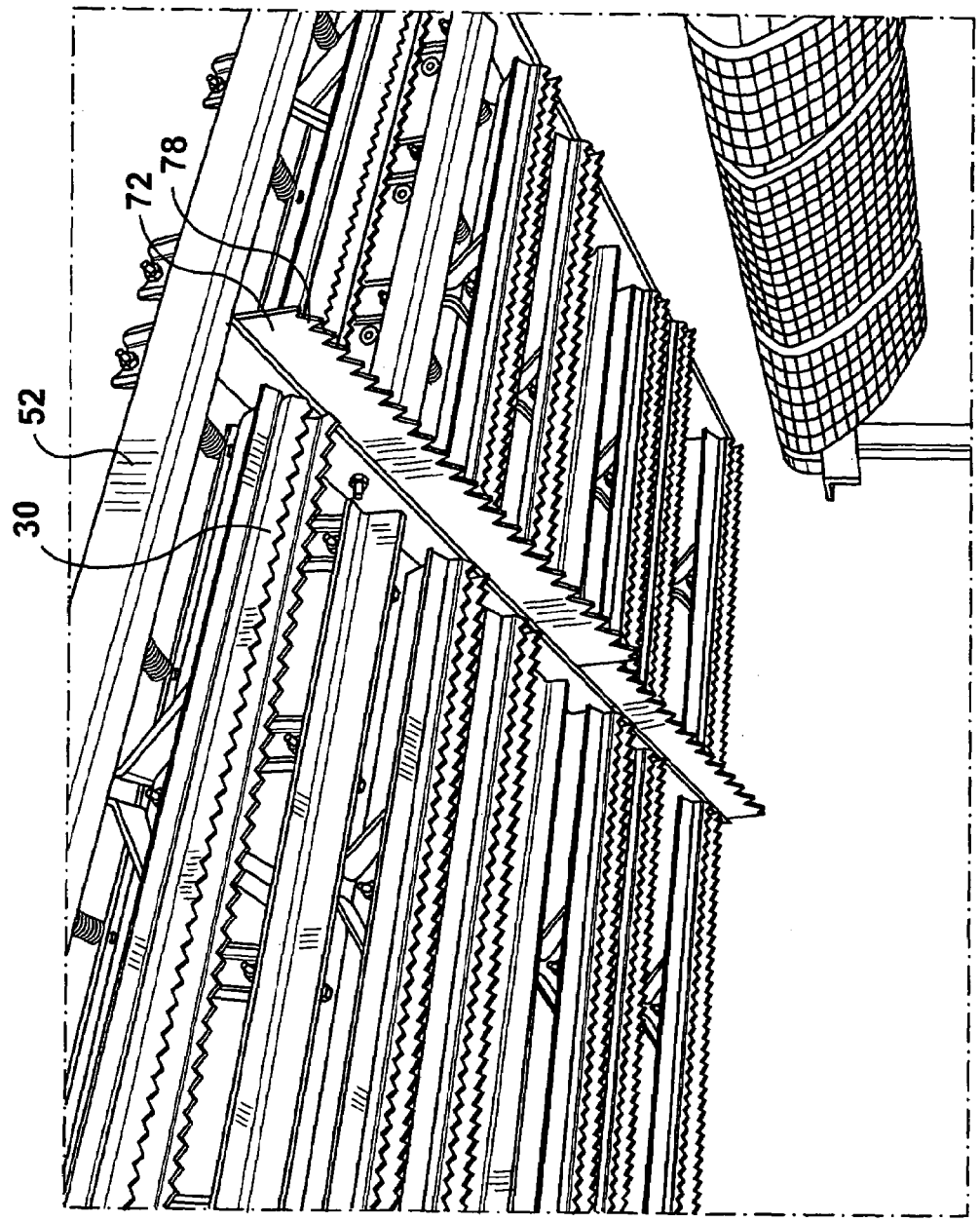
FIG. 12 is a perspective view from below of the clamp apparatus of FIG. 6, and also showing a sod cut-off.
Figure 12A:
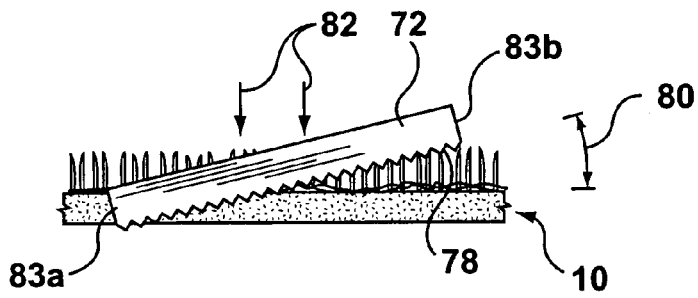
FIG. 12A is a side view showing details of the sod cut-off.

As best shown in FIGS. 11, 12 and 12A, the cut-off blade is a flat thin blade having serrated cutting teeth 78 at its bottom, to more easily penetrate the sod slab 10. The bottom edge of the cut-off blade 72 is linear (apart from the serrated teeth 78) and slopes at an angle to the plane of the sod slab 10, as shown in FIG. 12A (where the angle, indicated at 80, is exaggerated). With the angled mounting of the cut-off blade 72, then, when the cut-off blade 72 is lowered in the direction of arrows 82, one end 83a of the cut-off blade will penetrate and cut the sod before the other end 83b of the cut-off blade 72 enters the sod. It is found that this angled position of the cut-off blade 72 substantially reduces the force with which the cut-off blade need be pushed into the sod slab 10, enabling a lighter gauge cut-off blade and a smaller cut-off operating mechanism to be used.

Figure 12B:
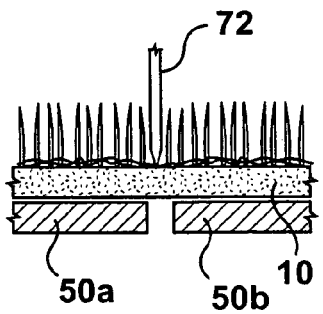
FIG. 12B is a diagrammatic sectional view showing further details of the sod cut-off.

The sod slab 10 is normally cut into two pieces by the cut-off blade 72 before the sod slab is lifted. The sod slab 72, now consisting of two pieces, is then lifted by the lifting mechanism described and moved to a desired location such as a pallet for stacking.

Where the cut-off blade 72 is used, the conveyor 50 on which the sod slab rests will normally be divided into two conveyor sections 50a, 50b as shown in FIG. 12B, so that the cut-off blade 72 may extend into the space between the two conveyor sections.

While the cut-off blade 72 is shown as having serrated teeth, it can of course be provided simply with a sharp straight edge or other appropriate cutting configuration, so long as it slopes at an angle to the plane of the sod slab 10. The angled arrangement alleviates the formerly very difficult problem of how to cut the sod when the sod is no longer in the ground.

It will, however, be appreciated that the feature of sloping the cut-off blade at an angle to the plane of the sod slab can also be used in conventional cut-off devices provided in standard sod harvesters, to cut the sod transversely while it is in the ground. It is found that less force is needed for the cut-off mechanism when the cut-off blade is angled as described.

Figure 14:
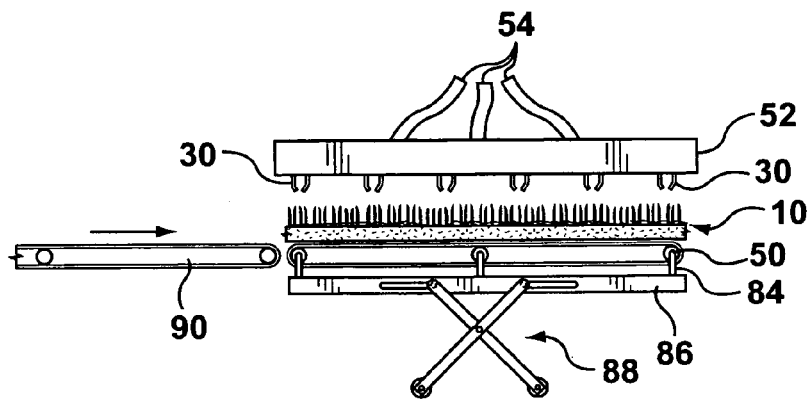
FIG. 14 is a diagrammatic view showing apparatus similar to that of FIGS. 6 to 13, but in which the sod slab is lifted toward the clamps rather than lowering the clamps onto the sod slab.

As described previously, in connection with FIGS. 1 and 2, and as indicated in FIG. 14, instead of lowering the clamps 30 onto the sod slab 10, the support on which the sod slab 10 rests (shown in FIGS. 6 to 13 as conveyors) can be raised (by a scissors lift or other desired operating mechanism) to push the sod up against and into the open clamps 30. FIG. 14 shows conveyor supports 84 mounted on a platform 86 which is raised and lowered by a scissors lift 88. After the sod has been raised, the clamps 30 are then closed. Then, while the frame 52 with the sod slab 10 suspended therefrom is being moved to a desired location (e.g. to stack the sod slab), the platform 86 can be lowered to receive the next slab of sod as delivered by the conveyors 90.

Figure 15:
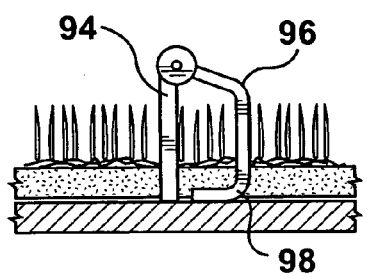
FIG. 15 is a diagrammatic view of another embodiment of a clamp design, in which the clamp is hinged.
Figure 16:
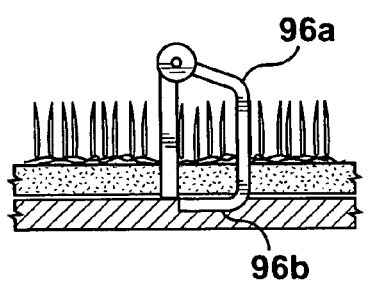
FIG. 16 is a diagrammatic view of yet another embodiment of a clamp design, in which the clamp is hinged.

While preferred embodiments have been described, it will be realized that various changes can be made. For example, the shape of the side members 32, 34 of the clamps 30 can be changed. As an example, and as shown in FIG. 15, one side member 94 can be straight, while only the other side member 96 can be hooked as shown at 98. The hook 98 can be advantageous in hooking part of the thatch of the sod or the soil portion of the slab. As shown in FIG. 16, the hook 98a can protrude below the bottom of side member 94a, so that these two points do not touch each other but do grip the upper part of the soil portion 16 between them.

Figure 17:
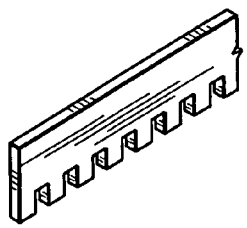
FIG. 17 is a diagrammatic view showing a modified clamp design.
Figure 13:
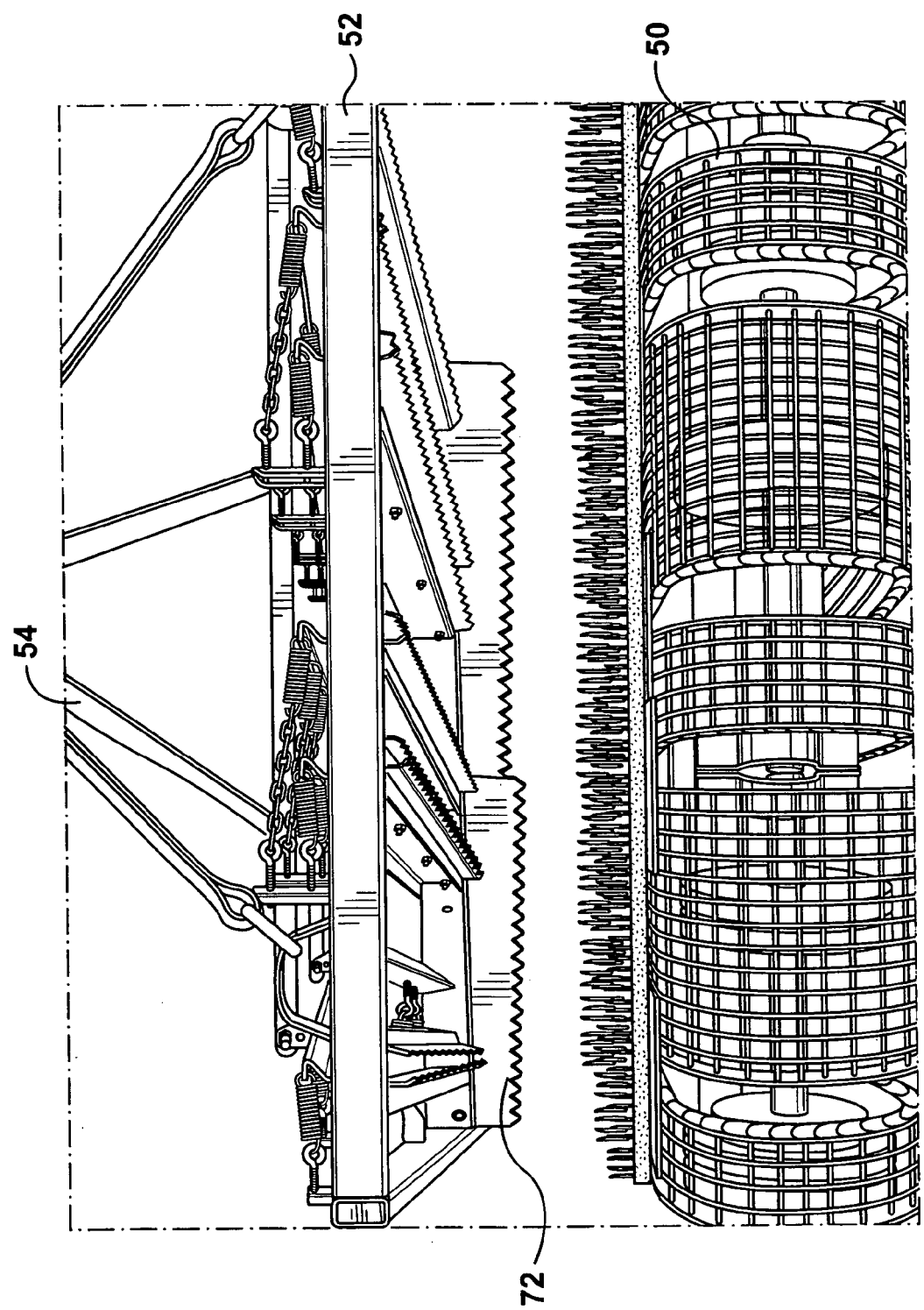
FIG. 13 is a perspective view showing the clamp structure of FIG. 6 and its associated cut-off descending on a sod slab.

In addition, the teeth at the bottom of the side members of the clamps can be eliminated, or can be changed in shape, for example as shown at 100 in FIG. 17. Where teeth are used, it is preferred that they interlock, i.e. that the teeth of one side portion of the clamp fit into the spaces between the teeth of the other side portion of the clamp, for better gripping of the sod.

FIGS. 18 to 20 show an embodiment in which two screens are used to engage and pickup slabs of sod positioned with the grass side upper most. FIG. 18 shows a sod slab 110 having grass blades 112, with a screen 114 pressed down on the upper surface of the slab and with the blades 112 projecting upwardly therethrough. The second screen 116 is moved sideways over the first screen to bend sideways the portions of the grass blades which extend above the first screen. When the second screen 116 is located above the first screen 114, as shown in FIG. 19, it is then pressed against the first screen to clamp or trap the blades of grass between the two screens, as shown in the enlarged view of FIG. 20 (which shows projecting grass blade portions 118 clamped between the meshes of the two screens). The two screens 114, 116, still pressed together, can then be lifted (by a conventional lifting mechanism, not shown), carrying the sod slab with them, and moved to a desired location where the sod slab can be released.

If desired, and as shown in FIG. 21, the upper screen 116 can be replaced by a flat plate 120. The plate 120 functions as well as or better than the upper screen 116, since there is no need for the grass blades to project through the upper screen (only through the lower screen), and the plate 120 effectively clamps the projecting portions 118 of the grass blades against the lower screen 114.

While the upper screen 116 or flat plate 120 have been described as being moved sideways to bend over the grass blades before they are clamped against the lower screen 114, under some conditions the upper screen 116 or plate 120 can simply be moved downwardly and will still trap sufficient portions of the grass blades against the lower screen 114 to provide an effective clamping action, so that the sod can be lifted.

Other changes may be made within the scope of the invention, and all are intended to be included within the invention.

We claim:

1. A method of handling a slab of sod having grass blades projecting upwardly therefrom, comprising providing a set of clamps, said set comprising a plurality of clamps, each clamp having first and second opposing clamp surfaces, each clamp having an open condition in which said clamp surfaces of such clamp are spaced apart from each other and a closed condition in which said clamp surfaces of such clamp press against each other, at least one of said clamp surfaces of each clamp being moveable toward the other clamp surface of such clamp to change the condition of each clamp from said open condition to said closed condition, said method comprising providing said slab or sod, moving at least one of said sets of clamps and said sod toward the other of said set of clamps and said sod, with said clamps in said open condition, until said set of clamps engages an upper portion of said slab of sod, then changing the condition of all of said clamps of said set to said closed condition thereby gripping said upper portion of said sod between said opposing clamp surfaces of said clamps of said set, and then moving said set of clamps with said sod suspended from the clamps of said set.

2. A method according to claim 1 wherein said clamps clamp at least some of said grass blades of said slab of sod by contacting such grass blades with said clamp surfaces and pressing such grass blades between said clamp surfaces.

3. A method according to claim 1 wherein said sod has thatch, and said clamp clamps said thatch.

4. A method according to claim 1 wherein said sod has a base comprising a soil portion containing roots, and said clamp grips an upper part of said soil portion.

5. A method according to claim 1 wherein said clamp of said set of clamps are elongated and extend parallel to each other.

6. A method according to claim 5 wherein after said set of clamps engages said upper portion of said slab of sod and the condition of said clamps is then changed to said closed condition, said set of clamps is then lifted to raise said slab of sod, and then said clamps are moved to move said slab of sod.

7. A method according to claim 5 including raising said sod on a support towards said clamps with said clamps open, closing said clamps to grip said sod, lowering said support leaving said sod suspended from said clamps, and then moving said clamps with said sod suspended therefrom.

8. A method according to claim 5 and including the steps of lowering said clamps toward said sod with said clamps open and raising said sod on a support toward said clamps, closing said clamps to grip said sod, and moving said clamps and said support away from each other with said sod suspended from said clamps.

* * * * *